US009990707B2

United States Patent
Czaplewski et al.

(10) Patent No.: US 9,990,707 B2
(45) Date of Patent: Jun. 5, 2018

(54) IMAGE ANALYSIS METHODS FOR PLATED THROUGH HOLE RELIABILITY

(71) Applicant: International Business Machines Corporation, Armonk, NY (US)

(72) Inventors: Sarah K. Czaplewski, Rochester, MN (US); Scott B. King, Rochester, MN (US); Joseph Kuczynski, North Port, FL (US); David J. Russell, Owego, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 15/151,794

(22) Filed: May 11, 2016

(65) Prior Publication Data

US 2017/0330316 A1    Nov. 16, 2017

(51) Int. Cl.
G06T 7/00 (2017.01)
G06T 7/40 (2017.01)

(52) U.S. Cl.
CPC .............. *G06T 7/0006* (2013.01); *G06T 7/40* (2013.01); *G06T 2207/30141* (2013.01)

(58) Field of Classification Search
None
See application file for complete search history.

(56) References Cited

U.S. PATENT DOCUMENTS

| 4,858,479 | A | 8/1989 | Voss et al. |
| 5,189,490 | A | 2/1993 | Shetty et al. |
| 2002/0054703 | A1* | 5/2002 | Hiroi ................. G01N 21/9501 382/149 |
| 2002/0192444 | A1* | 12/2002 | Curcio ................. H01L 23/488 428/209 |
| 2006/0103404 | A1* | 5/2006 | Desai ................. G01R 31/287 324/750.03 |
| 2007/0235220 | A1* | 10/2007 | Shin ..................... H05K 3/462 174/262 |
| 2007/0278627 | A1* | 12/2007 | Kakei ................... H01G 4/005 257/632 |

(Continued)

FOREIGN PATENT DOCUMENTS

| FR | 2619927 A1 | 3/1989 |
| JP | 04316343 | 11/1992 |
| TW | 517847 | 1/2003 |

OTHER PUBLICATIONS

Micro Section of a PTH, Eurocircuits, 2015, http://www.eurocircuits.com/Micro-section-of-a-PTH, 10 pages.

(Continued)

*Primary Examiner* — Delomia L Gilliard
(74) *Attorney, Agent, or Firm* — Patterson + Sheridan, LLP

(57) ABSTRACT

In some embodiments, methods include acquiring a micrograph image of a plated through hole and converting the micrograph image to a binary image. Methods include defining a pixel line at a copper-dielectric material interface of the binary image. In some embodiments, methods include comparing a length of an interface line compared to a length of a portion to determine a roughness of the pixel line. In some embodiments, methods include determining a roughness of the hole wall before copper plating. Methods may include determining a roughness of the interface using the pixel line.

20 Claims, 5 Drawing Sheets

(56) References Cited

U.S. PATENT DOCUMENTS

2012/0125514 A1* 5/2012 Wei ................ H05K 3/385
                                                    156/60
2017/0200568 A1* 7/2017 Kawaguchi ............ C25D 11/20
2017/0214059 A1* 7/2017 Komatsu ................. C25D 9/12

OTHER PUBLICATIONS

Plated-Through Hole Structure Evaluation, IPC-TM-650 Test Methods Manual, 2.1.3A, IPC Association Connecting Electronics Industries, Aug. 1976, p. 1.
Yash Sutariya, Built Board Tough, The PCB Magazine, Jul. 2012, pp. 12-21.

* cited by examiner

IMAGE ANALYSIS METHODS FOR PLATED THROUGH HOLE RELIABILITY

FIELD

The present disclosure relates to methods for examining the roughness of plated through holes in printed circuit boards.

BACKGROUND

In the fabrication of a printed circuit board (PCB) it is desirable to provide electrical connection of circuits at various layers within the PCB. This is typically done using a plated through hole (PTH). A PTH is typically formed using the steps of drilling, desmearing, and plating. The hole quality before plating has an impact on the robustness of the finished PTH, e.g., its ability to withstand thermal cycling, such as through multiple high temperature solder reflows, without fatiguing to the point of failure. Standard practice is to judge the hole quality by visually observing the roughness of the hole sidewall.

There are several variables in the drilling process which can affect the hole roughness. The drill bit design, the drill bit sharpness, the dielectric material being drilled, the rotation of the drill bit (speed) and the rate at which the drill bit is forced down through the PCB (feed) all can play a role in the hole roughness.

Typically, a desmear process is used after drilling to remove dielectric material which may be smeared onto the inner plane edges exposed during drilling, due to the nature of the dielectric and the localized heat generated by the drilling process. While other techniques, such as plasma, can be used, a typical desmear process consists of swelling the resin with an organic solvent, etching the resin with a hot alkaline potassium permanganate solution, and neutralizing the alkaline permanganate with an acid such as sulfuric acid. Various parameters such as the time and temperature in the sweller, and time, temperature in the permanganate etch, as well as the permanganate concentration, can affect the dielectric etching. If the etching is not aggressive enough, smear will remain on the plane edges exposed by drilling and can result in a poor electrical/mechanical connection when the PTH is plated. If the etch is too aggressive, the resin can be etched back too much resulting in excessive hole roughness that can cause defects.

Following desmear, the PTH is plated, typically with copper. A variety of plating processes can be used, such as full panel plate or pattern plate. A typical plating process involves applying a seed layer in the hole, such as colloidal palladium. An electroless copper bath is used to deposit a layer of copper thick enough to carry some current, then the PCB is plated in an electrolytic copper bath. Since the plating follows the topography of the PTH sidewall, the roughness of the copper plating is influenced by the roughness of the sidewall prior to plating.

The PTH reliability is strongly influenced by the sidewall roughness, and that the sidewall roughness is influenced by the drilling process and the desmear process, and that the drill, desmear, and plate operations need to be co-optimized to achieve the best results. Standard practice is to experimentally vary the drill, desmear, and plate parameters when a new process is needed, such as for a new dielectric material or a new PCB thickness. The effectiveness of a given set of parameters is typically determined by visually observing the sidewall roughness from a cross section of a PTH. The final set of parameters is typically determined by reliability testing, such as Current Induced Thermal Cycling (CITC), Interconnect Stress Testing (IST), or thermal cycling.

IST and CITC utilize testing of current flow/resistance through a part of a circuit board. If the resistance of a circuit (containing plated through holes) changes during testing to a level of about a 10% increase in resistance, a structural failure has occurred within the interconnect. These methods determine a change in resistance of plated barrels, a commonly used term referring to a plurality of plated-through holes, and/or internal connections as they undergo thermal cycling.

IST involves passing a predetermined constant direct current (DC) through a coupon. The DC increases the temperature of the metals of the coupon by resistive heating and adjacent materials of the coupon by conduction. The increased temperature of the coupon is directly proportional to the measured resistance and the amount of current that is passed through the conductors, pads and holes.

An IST system can raise the temperature of the coupon through resistive heating to between about 130° C. and about 300° C., such as about 150° C. and about 260° C., for example about 230° C. Once the temperature has been increased to a particular temperature, the increased temperature may be maintained for between about 10 seconds and about 10 minutes, such as about 1 minute and about 5 minutes, such as about 2 minutes and about 3 minutes. The system then discontinues electric current and allows/initiates cooling. Cooling may be performed by forced air cooling, allowing the coupon to return to ambient. One heating and cooling constitutes a single thermal cycle. IST processes of the present disclosure may be performed on any suitable IST processing equipment, an example of which may be obtained from PWB Interconnect Solutions, Inc. (Canada).

During each thermal cycle, the IST system may continuously monitor the resistance changes of the coupon. As the temperature of an interconnect increases (or decreases), the resistance values of the interconnect (i.e. traces, pads and hole barrels) may also measure proportional changes. The IST method is designed to quantify an ability of the interconnect structures (the coupon) to withstand the thermal/mechanical stresses. Testing may be completed on the as manufactured and the assembled state, which assists an assessment of when the product reaches the point of interconnect degradation/failure.

If interconnects have few defects, for example, if the quality of the interconnects is unaffected for several hundreds of these cycles, the resistance values before, during and after the cycles are substantially similar, if not the same. If the measured resistance changes from one cycle to a subsequent cycle, whether positive or negative, then one or more defects within the interconnect may have formed. When a failure state has initiated in the coupon, the measured difference in resistance is usually very small (sub-milliohm). When larger resistance changes are detected, a defect that ultimately leads to a product failure has initiated/started. IST provides determination of when defect(s) begins to develop or have already developed, as well as how rapidly defect(s) accumulate. Changes in current may be monitored on three circuits: the first may be the heating circuit which carries the current through the internal layers, and can monitor the resistance changes, measuring for interconnect separations or foil cracking. The second and third circuits receive no current—these circuits are responsible for measuring the PTH, blind, buried or micro-via interconnect reliability. The system may repeat the cycles, measuring the resistance continuously until a rejection criteria is achieved; rejection could be set at a predetermined increase in resistance or a pre-set number of cycles. Data collection, reporting and analysis may be performed by any suitable software. The system may graphically display the performance of each coupon for a particular test and provides feedback regarding defect initiation and ultimate interconnect failure. The IST system allows determination of interconnect failure before a larger overall failure occurs.

IST utilizes the internal interconnect to heat the coupon; heat generation is created throughout the daisy chain of copper conductors, pads and vias. Throughout testing, any local areas of increased resistance within an interconnect will cause localized heating to occur. Measurements above a 1% increase in elevated resistance signify failure initiation. The increased resistance is caused by areas of localized strain.

Software may calculate and display the resistance of a test temperature, e.g., between about 30° C. and about 350° C., such as about 50° C. and about 270° C. An equation used to calculate a desired resistance is as follows: Target Resistance=Rrm×(1+αT[Th−Trm]), where αT is the estimated thermal coefficient of resistance for the interconnect, Rrm is the resistance of a coupon at ambient temperature, Th is test temperature, and Trm is ambient/room temperature (approximately 25° C.). System software calculates and displays the resistance change, which is adjustable from a 1% to a 100% increase. A typical failure threshold value is a 10% change in resistance. An equation to calculate the failure threshold is as follows: Failure Threshold=(RT1×Rr)+RT1. Failure Threshold is in resistance. RT1 is resistance of coupon at test temperature for Cycle 1 and Rr is resistance change (typically 10%).

A coupon's resistance "delta" (the difference of resistance of a coupon at test temperature for Cycle 2) increases (positively) as failure initiates and progresses. The rate of change in delta indicates defect formation (failure) within the barrel and/or internal connections. When a coupon delta reaches an undesired resistance, the cycle testing is stopped for that coupon, providing failure analysis of a coupon before the extent of damage affects the ability of the coupon to be analyzed.

As with IST, Current Induced Thermal Cycling (CITC) determines a failure based on a percentage change in the bulk resistance of the coupon at the designated temperature. When percentage change increases to an undesired level, a test is terminated for a coupon. A test coupon may be resistance heated by passing direct current through the coupon to bring the temperature of the copper to a desired temperature. Like IST, CITC involves one or more cycles of temperature increase and subsequent cooling. CITC processes of the present disclosure may be performed on any suitable CITC processing equipment, which may be obtained from i3 Electronics (USA).

In some embodiments, a CITC process includes a coupon with an electrical net. The net includes via structure connected by circuit lines in a daisy chain. Direct current may be passed through the electrical net to provide heat to the coupon until a desired increased temperature is achieved, followed by removing the direct current and cooling the coupons to about ambient temperature. This sequence represents one cycle of CITC. Cycling may be repeated for a desired number of cycles and/or until a failure is detected by measuring a temperature coefficient of resistance (TCR).

For CITC, the TCR of each coupon may be determined for typically from about 2 to about 4 coupons. IST temperature test ranges may be between about 15° C. and about 300° C., such as about 23° C. and about 220° C. Like IST, CITC is a thermally cyclic process. The number of cycles for CITC may be between about 2 cycles and about 50 cycles, such as about 5 cycles and about 15 cycles, for example about 10 cycles. A temperature ramp rate of a coupon for CITC may be between about 1° C./second and about 20° C./second, such as about 2° C./second and about 7° C./second, for example 3° C. A dwell time at an elevated test temperature may be between about 5 seconds and about 5 minutes, such as about 20 seconds, and about 60 seconds, for example 40 seconds.

At each temperature during a CITC test, a computer may control an oven temperature and monitor and record an equilibrium resistance. TCR may be calculated for each coupon as follows: TCR(T)=[(Rh−Rrm)]/[(Th−Trm)×Rrm. TCR(T) is the calculated TCR for a coupon as a function of test temperature (T), Th is the temperature of a coupon at oven temperature, Rh is the resistance of a coupon at an oven temperature, Rrm is a resistance of a coupon at ambient temperature, and Trm is an ambient temperature (for example, about 23° C.).

A computer may calculate and display a coupon test temperature using the following equation: T=Trm+[(R−Rrm)/(Rrm×TCR(T))]. TCR(T) is the measured thermal coefficient of resistance for the coupon(s), Rrm is the resistance of a coupon at ambient temperature measured at the start of each cycle, T is a coupon test temperature calculated at 1 second interval, R is a coupon resistance measured at 1 second intervals, and Trm is the ambient temperature measured at each cycle (for example, about 23° C.). Alternatively, this equation may be expressed in terms of the target resistance that is equivalent to the targeted increased temperature for the coupon and cycle, as follows: Target Resistance=Rrm×(1+TCR(Th)[Th−Trm]). Th is the target high test temperature. If defects become too prevalent, a failure will begin to occur, for example, when R exceeds between about 1% and about 10%, and/or final Rrm(n) after cooling a coupon is between about 3% and about 10% difference from Rrm(0) at the start of the CITC test before the first cycle.

A CITC process may include placing coupon(s) in a table top test fixture that includes one or more cooling fans and quick connect housings. Direct current may be used to heat the one or more coupon(s) at a predetermined ramp rate up to a test temperature. When a test temperature is achieved, the temperature is maintained for a dwell time, followed by cooling the coupon(s) with the one or more cooling fans. The coupon(s) undergo thermal cycles until one of the rejection criteria described above occurs or a maximum desired number of cycles is achieved.

A computer may monitor and record changes in resistance of the plated barrel throughout the CITC process.

Such methods are designed to monitor these changes and stop the stressing at a pre-determined (low) level of failure. However, these methods typically involve thermal cycling which is time-consuming, expensive, and only 4 coupons can be tested at one time, necessitating multiple runs to complete a study of a circuit board. More importantly, these methods are limited in that defects in the plated through holes are detected close to or after a failure (open circuit) state.

Therefore, there is a need in the art for quantitative and precise defect detection methods for plated through holes, which may be used complimentarily to CITC and IST or as a diagnostic to determine whether CITC or IST should be performed at all.

SUMMARY

Methods disclosed herein include acquiring a micrograph image of a plated through hole and converting the micrograph image to a binary image. Methods include defining a pixel line at a copper-dielectric material interface of the binary image. In some embodiments, methods include determining a roughness of the interface by using the pixel line. In some embodiments, methods include determining a roughness of the plating in the through hole from the roughness of the interface.

Other methods disclosed herein include acquiring a micrograph image of a plated through hole and converting the micrograph image to a binary image. Methods include obtaining a wall roughness value by dividing a number of pixels on a pixel line by the length of a corresponding portion of the binary image.

BRIEF DESCRIPTION OF THE DRAWINGS

So that the manner in which the above recited features of the present disclosure can be understood in detail, a more particular description of the present disclosure, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

DETAILED DESCRIPTION

Figure 1:
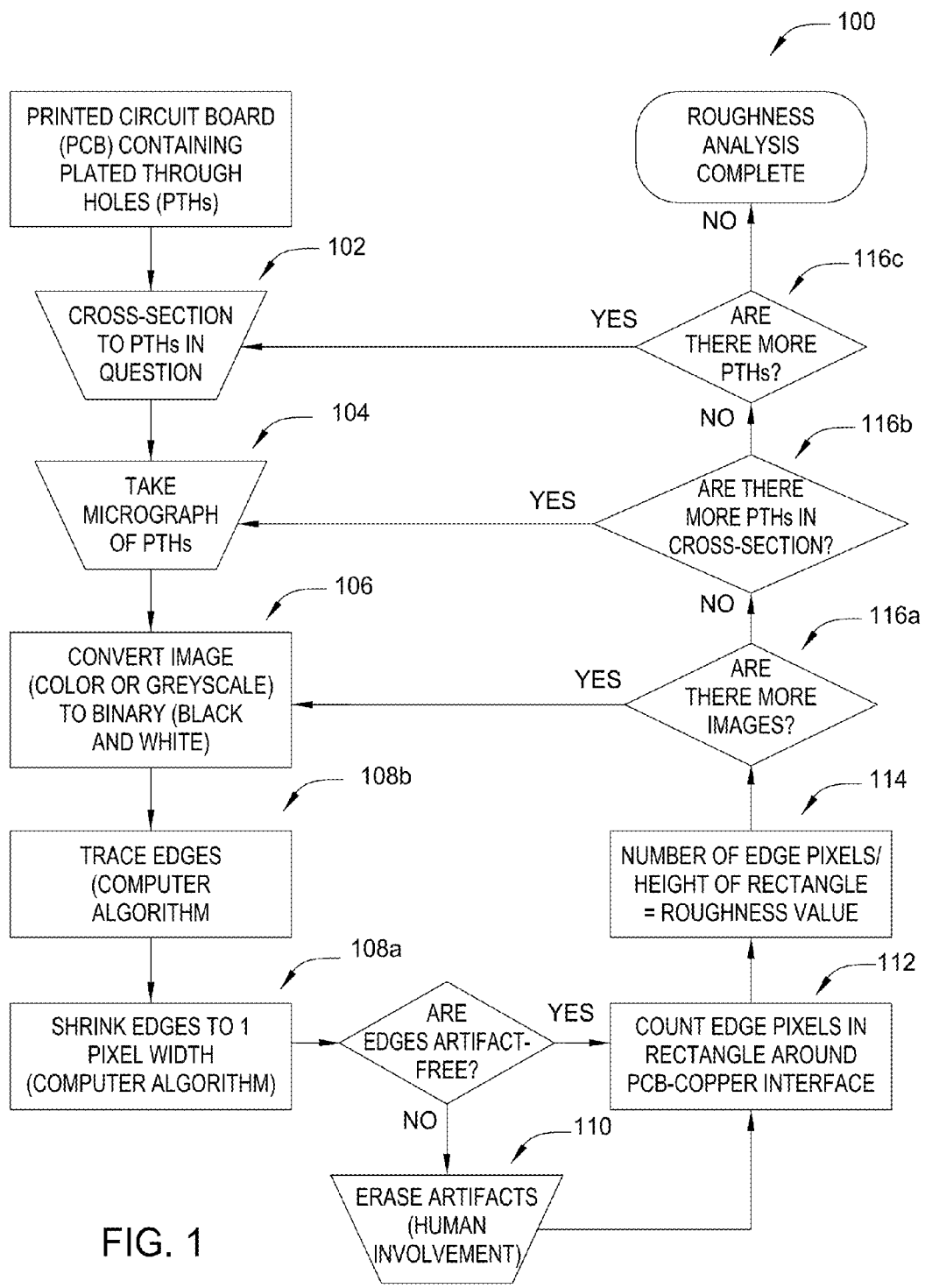
FIG. 1 is a schematic process for automated and quantitative PTH wall roughness determination of the present disclosure, according to some embodiments.

New methods of determining the roughness of a plated through hole in a printed circuit board are disclosed. In some embodiments, the methods include acquiring a micrograph image of a plated through hole and converting the micrograph image to a binary image by using a first process. Methods further include defining a pixel line at a metal-dielectric material interface of the binary image. The metal may include copper. Methods further include defining a pixel line at a metal-dielectric material interface of the binary image. Methods further include determining a roughness of the interface by using the pixel line.

Defining the pixel line may include shrinking the material interface to a width of about 1-pixel. Methods may include tracing an analysis section around a portion of the binary image. Tracing may include defining an axis along the pixel line and selecting an interval along the axis. Methods may include acquiring a cross section micrograph image of a printed circuit board having one or more plated through holes.

A plated through hole may have an interface between a copper plating and a dielectric material. In some embodiments, methods further include acquiring a second micrograph image of the plated through hole and converting the second micrograph image to a second binary image. Methods may include defining a second pixel line at a metal-dielectric material interface on the second binary image. The metal may include copper.

Methods further include performing a pixel count of the analysis section to provide a number of pixels on the pixel line. Performing a pixel count may be achieved using an algorithm. Methods further include dividing a length of the pixel line and/or the number of pixels on the pixel line by the length of the analysis section to obtain a wall roughness value.

Methods include defining a second pixel line by shrinking a second material interface to a width of about 1-pixel and tracing a second analysis section around a portion of the binary image. Methods include performing a second pixel count of the second analysis section to provide a number of pixels on the second pixel line. Methods include obtaining an average wall roughness value using the length of the first pixel line and/or number of pixels on the first pixel line and the length of the second pixel line and/or number of pixels on the second pixel line.

Because PTH imaging methods described herein are complimentary to CITC and IST processes, methods of the present disclosure further include performing a current induced thermal cycling process and/or an interconnect stress test.

Methods of the present disclosure further include acquiring a micrograph image of a plated through hole, converting the micrograph image to a binary image, and obtaining a wall roughness value by dividing a length of a pixel line and/or a number of pixels on a pixel line by the length of a corresponding portion of the binary image. Methods further include performing a pixel count of the portion to determine a number of pixels on the pixel line. Performing the pixel count may include using an algorithm. Methods include defining the pixel line by using an algorithm. Defining the pixel line further may include shrinking the material interface to a width of about 1-pixel. The wall roughness value may be between about 1 and about 2.

In some embodiments, methods include forming a through hole by drilling a hole into a dielectric material, etching the through hole, comparing a length of an interface line compared to a length of a portion to determine a roughness, and plating the through hole. Drilling a hole in dielectric material, etching the through hole, and plating the through may be accomplished using any suitable drilling, etching, and plating methods, respectively.

The wall roughness of a plated through hole (PTH) is the surface of a dielectric material after drilling of a through hole and/or the interface between the copper material and the dielectric material of a PTH. The wall roughness created during hole drilling of a PTH contributes to PTH reliability/endurance. Rougher PTH walls can cause stress risers in the copper plating, which can reduce performance of the circuit board, and smoother walls generally result in better PTH performance. Therefore, lower measured roughness values indicate better performing PTHs. PTH imaging methods of the present disclosure may be used to test PTH roughness as a replacement of or as a compliment to CITC and IST methods. In a preferred embodiment, PTH imaging methods of the present disclosure are used as complimentary methods to CITC and IST methods. PTH imaging methods of the present disclosure may be, for example, screening processes to determine whether CITC and/or IST methods should be subsequently performed.

Methods of the present disclosure may involve testing plated through hole roughness by using one or more test coupons containing one or more circuits of a circuit board.

Test coupons are designed to ensure thermal uniformity across the entire test circuit area. Coupons may be very flexible and contain between about 2 and about 50 layers, such as between about 4 layers and about 20 layers. The coupons may have varying metal (e.g., copper) weights such as between about 1/12 oz and about 20 oz of metal, such as about 1/4 oz and about 10 oz. The coupons may have various constructions, hole/pad and anti-pad diameters. Grid sizes include 0.016", 0.020", 0.024", 0.028", 0.032", 0.040", 0.050", 0.060" 0.080", or 0.100". In some embodiments, a coupon is about 5"×1/2".

PTH Imaging Methods

Smoother PTH walls are typically achieved by a negative etchback process of the PTHs (before depositing a barrier layer) versus positive etchback processes. Positive etchback refers to aggressively removing resin from a through hole. For positive etchback, the copper conduction lands of the PTH tend to protrude into the PTH barrel further than the dielectric material. Negative etchback typically involves the copper conduction lands tending to be more recessed into the PTH barrel as compared to the dielectric material. Negative etchback typically results in a smoother wall than the positive etchback. PTH wall roughness may also be affected by other variables than a particular etchback process.

A microsection evaluation may be used to determine exact locations of PTH wall roughness, and this can be automated and can be done quantitatively. Automated and quantitative PTH wall roughness determination methods of the present disclosure correlate well with CITC performance. Typically, smoother PTH walls correlate with better performance of a circuit board, e.g. CITC performance. The automated and quantitative PTH wall roughness determination methods of the present disclosure provide quantitative PTH wall roughness determination (before a failure has initiated) and provide prediction of overall lifetime characteristics of PTHs.

Although non-visual reliability methods, such as IST and CITC, may be used as complimentary reliability methods, PTH imaging methods of the present disclosure provide automated and quantitative PTH wall roughness determination, saving time from running thermal cycles if, for example, the PTH wall roughness has reached a point of undesirable utility. Quantitative PTH wall roughness determination of the present disclosure further provides attenuation of the subjectivity of typical visual reliability methods, e.g. an engineer views a micrograph image and determines whether the PTH roughness is adequately low.

FIG. 1 is a schematic process for automated and quantitative PTH wall roughness determination 100 of the present disclosure. As shown in FIG. 1, a printed circuit board (PCB) containing plated-through holes (PTHs) is provided, and a cross section through the center of a PTH(s) from a section of the PCB is acquired at block 102.

Figure 2:
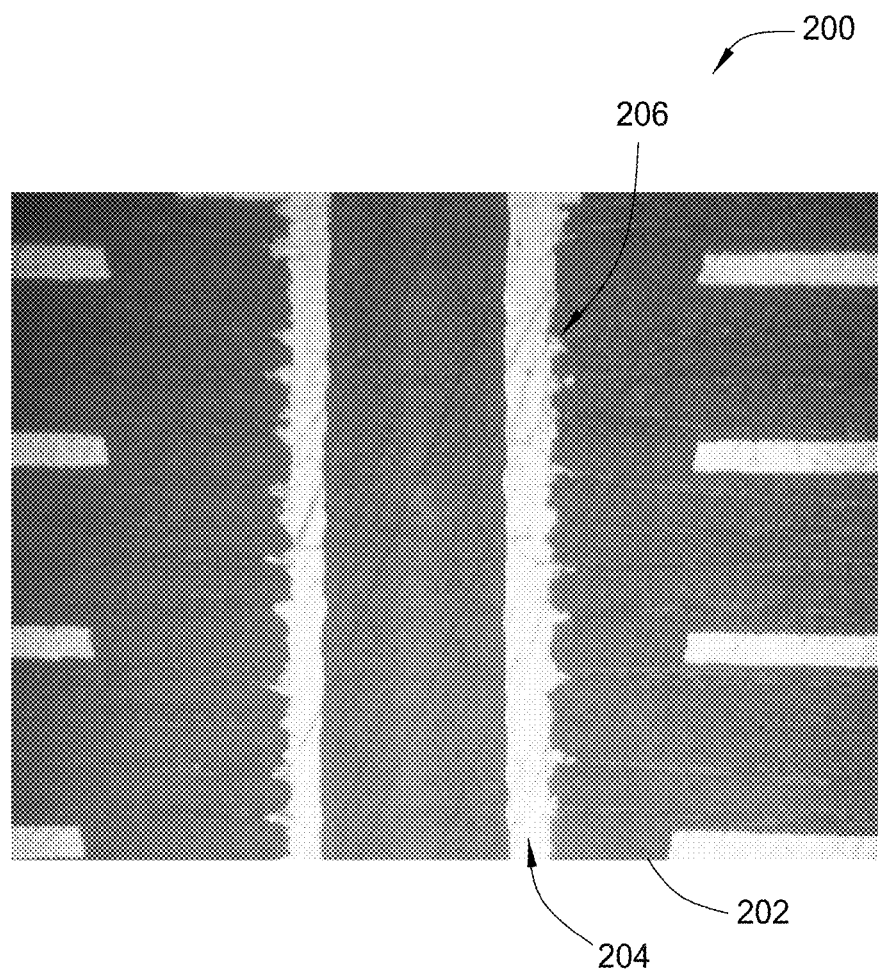
FIG. 2 is a micrograph image of a PTH cross section, according to some embodiments.

At block 104, one or more micrograph images of the PTH are acquired. FIG. 2 is a micrograph image of a PTH cross section 200. As shown in FIG. 2, a PTH cross section includes dielectric material 202 and copper plating 204. Dielectric material 202 and copper plating 204 meet at an interface 206 that possesses a PTH wall roughness.

A copper portion of the cross section reflects light, providing an image with sufficient contrast between a copper portion, such as copper plating 204, and a dielectric portion, such as dielectric material 202. A portion of the observed micrograph image can be encompassed with a rectangular area. The width of the rectangular analysis section should be wide enough to capture the PTH wall roughness, so as not to crop out edges of the PTH wall roughness. In some embodiments, a number of micrograph images for each PTH are obtained, such as between about 1 and about 20 images, such as between about 5 and about 12 images. More than one image obtained for each PTH may result in more accurate pixel count determination, as described below.

Figure 3:
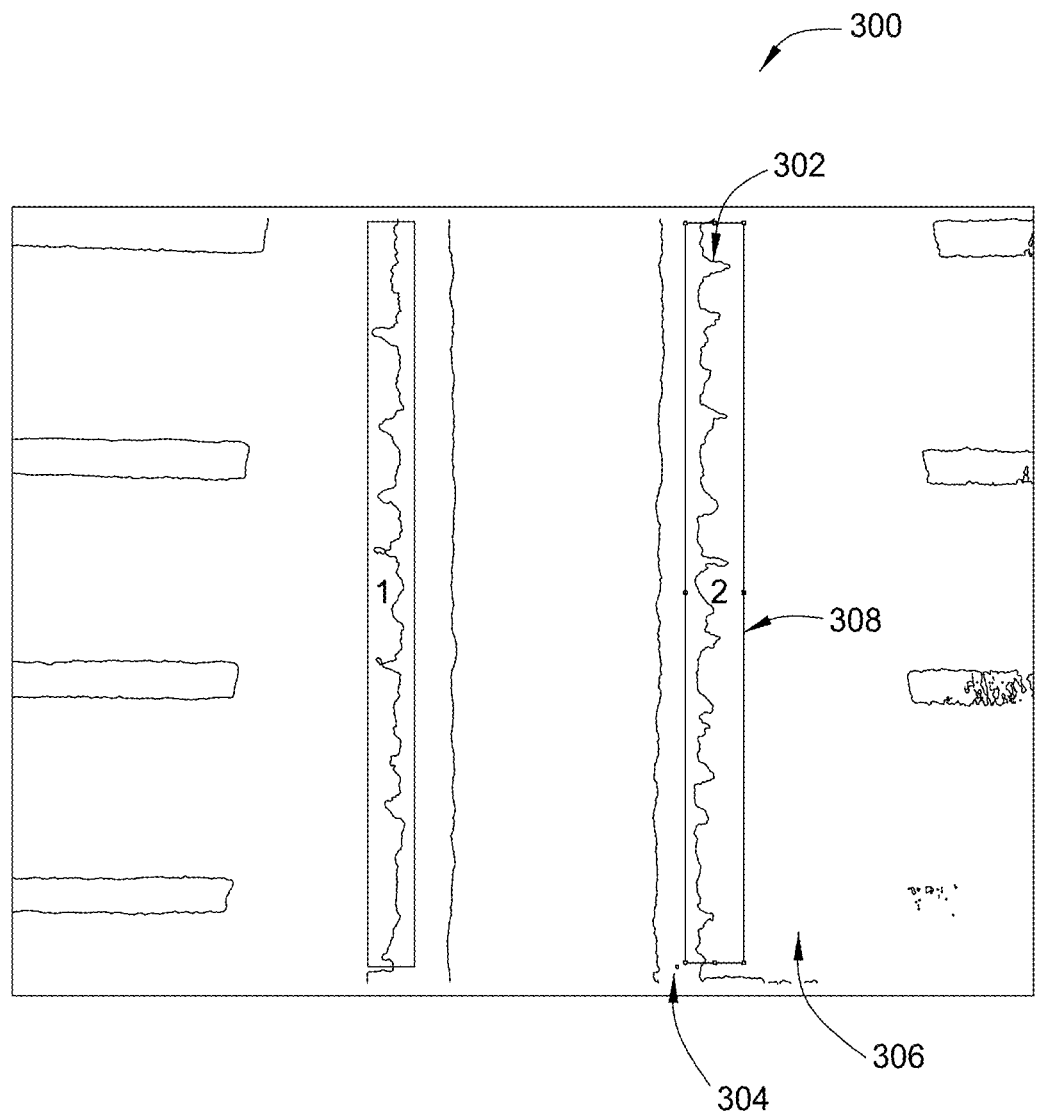
FIG. 3 is a micrograph binary image of a PTH cross section, according to some embodiments.

At block 106, the one or more micrograph images may be converted from color to a binary image (e.g., greyscale) using, for example, any suitable algorithm available from open-source software, such as ImageJ. FIG. 3 is a micrograph binary image of a PTH cross section 300. After converting the one or more micrograph images to a binary image, such as binary image 300, the image of the metal-dielectric material interface is shrunk to 1 pixel width (block 108*a*) using any convenient algorithm, to form a single pixel line 302 at the metal-dielectric material interface, providing a clear contrast between a metal material 304 and dielectric material 306 for more accurate pixel count determination, as described below. A rectangular area may be traced around a portion of the binary image, as shown at block 108*b*. As shown in FIG. 3, rectangular area 308 encompasses a portion of the binary image 300.

If the micrograph images and/or binary images contain undesired artifacts, these artifacts may be erased by the operator manually or removed algorithmically as being separate from the contiguous copper-dielectric material interface, as shown at block 110.

Using the single pixel line(s) of a binary image, a pixel count is performed (such as block 112) by counting the number of pixels on the PTH wall roughness edge shown in the image of the single pixel line(s). Counting the number of pixels may be performed using, for example, any suitable open source algorithm available from open source software, such as ImageJ. The length of the interface line (e.g., length of interface 206) may also be determined. The length of the interface line and/or the pixel count is then divided by the length of the rectangular area of the image along the single pixel line (such as block 114) to obtain a PTH wall roughness value. If, for example, a PTH wall roughness value of a first PTH is higher than a PTH wall roughness value of a second PTH, then the first PTH has more roughness of the PTH wall. In some embodiments, an acceptable PTH wall roughness value is between about 1.00 and about 2, such as about 1.05 and about 1.8, such as about 1.1 and about 1.4. A roughness value of 1.00 indicates a very smooth surface, while a roughness value of 2 indicates a very rough surface. In some embodiments, a roughness value of less than about 1.4 provides sufficient PTH performance. Furthermore, a PTH wall roughness value may be determined by repeating blocks 108*a*-*b*, 112, and 114, to obtain a PTH wall roughness value for each cycle of blocks 108*a*-*b*, 112, and 114. The PTH wall roughness values obtained from the cycles of blocks 108*a*-*b*, 112, and 114 may be averaged according to any convenient formula. For example, Table 1 illustrates pixel data and roughness values for two cycles (shown as Area 1 and Area 2) of blocks 108*a*-*b*, 112, and 114 performed for rectangular analysis section 308 of FIG. 3.

TABLE 1

| Label | Area | Width | Length | % Area | Black Pixels | Roughness |
|---|---|---|---|---|---|---|
| Area 1 | 105651 | 91 | 1161 | 1.64977 | 1743 | 1.501292 |
| Area 2 | 90636 | 78 | 1162 | 1.97824 | 1793 | 1.543029 |

As shown in Table 1, roughness values of 1.501292 and 1.543029 are obtained by two cycles of blocks 108*a*-*b*, 112, and 114. The values may be added to give 3.044321, and this value can be divided by the number of cycles (here, 2) to give an average PTH wall roughness value of 1.5221605 (about 1.52).

If additional images of the same portion of the PTH and/or images of additional portions of the barrel are desired, one or more steps of the process of FIG. 1 may be repeated, as shown at blocks 116a-c. A comparison of two or more images may be performed, if, for example, the magnification of the comparative images is the same. The two or more images may be obtained from the same barrel at different regions along the barrel's length. The pixel count of the two or more images may then be averaged to obtain an average PTH wall roughness value. In some embodiments, a barrel includes between about 5 and about 15 rectangular analysis sections, including, for example, rectangular analysis section 308. A multiple image comparison along the length of a barrel provides determination of comparative barrel roughness at an edge versus a middle section of the barrel. Thus, methods of the present disclosure further provide determination of non-uniformity of PTH wall roughness along a barrel in addition to quantitative and automated determination of PTH wall roughness of one or more portions of a barrel(s).

The method 100 may also be performed by defining a coordinate axis along the single pixel line, selecting an interval along the coordinate axis, counting the pixels falling within the interval on the coordinate axis, and dividing the number of pixels by the length of the interval.

Figure 4:
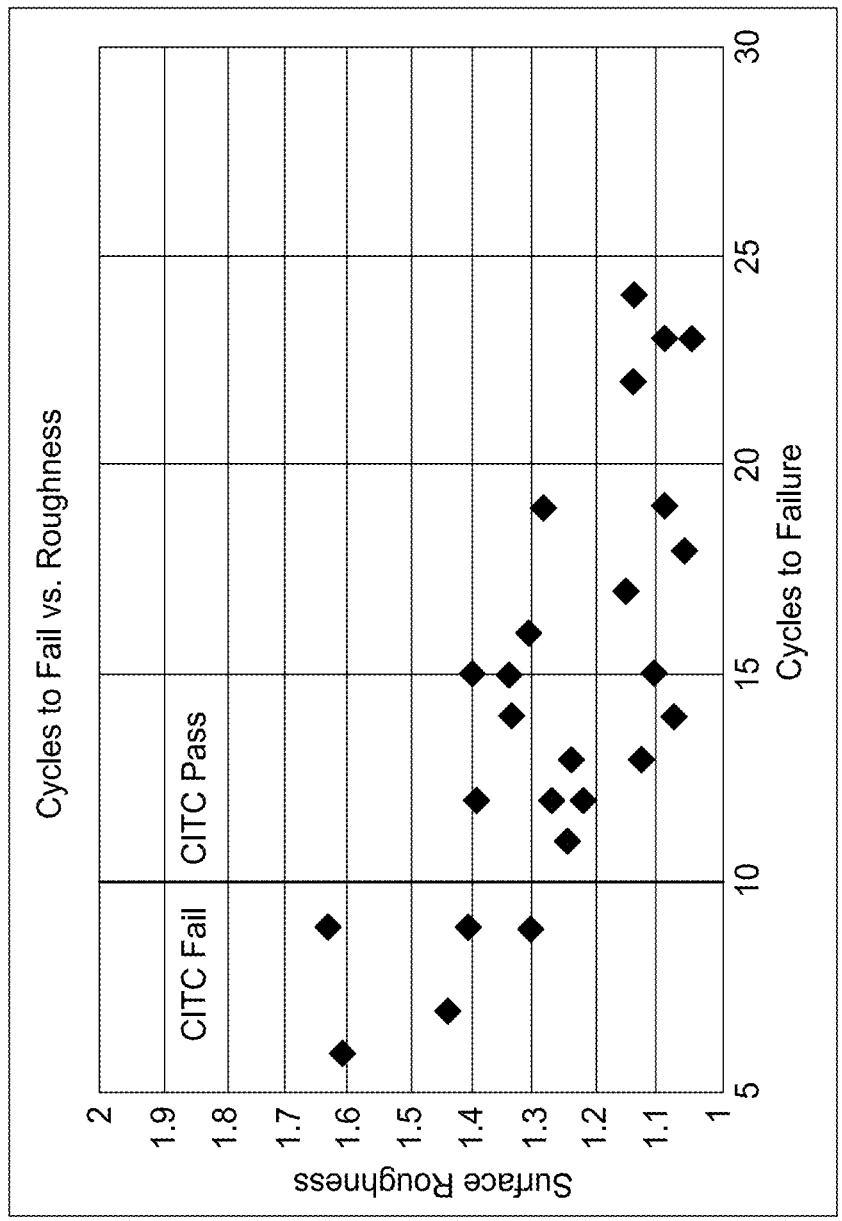
FIG. 4 illustrates PTH surface roughness versus CITC cycles to failure, according to some embodiments.

Automated and quantitative PTH wall roughness determination correlates well with CITC performance. FIG. 4 illustrates PTH wall surface roughness (utilizing PTH imaging methods of the present disclosure) versus CITC cycles to failure, as shown with data points (black diamonds). As shown in FIG. 4, PTH wall surface roughness values are lower for the coupons that survived a greater number of CITC thermal cycles. This demonstrates that lower PTH wall roughness correlates with better PTH reliability. Thus, PTH imaging methods of the present disclosure are complimentary to typical non-visual testing methods, such as IST and CITC.

Example 1

Example 1 includes a 260 mil thick printed circuit board fabricated with a high Tg, low loss dielectric and containing 10 mil PTHs. A 2 variable, 2 level full factorial experiment was designed to observe effects of desmear and plating on PTH roughness. Test coupons for CITC testing were processed. The coupons were fabricated through a conventional drill process. Following drilling, the coupons were split between 2 desmear processes. After desmearing, the coupons were further split between two plating processes as illustrated in Table 2 below.

TABLE 2

| Test coupon group | Desmear Process 1 | Desmear Process 2 |
| --- | --- | --- |
| Plating Process 1 | Group A | Group B |
| Plating Process 2 | Group C | Group D |

Cross sections were taken of representative coupons from each group and the hole wall roughness was measured using an image analysis technique of the present disclosure. Coupons from each group were also subjected to CITC testing and the "cycles to fail" was measured for several coupons from each group. To determine PTH reliability, more than 10 cycles to fail in CITC was set as the desirable result.

Figure 5:
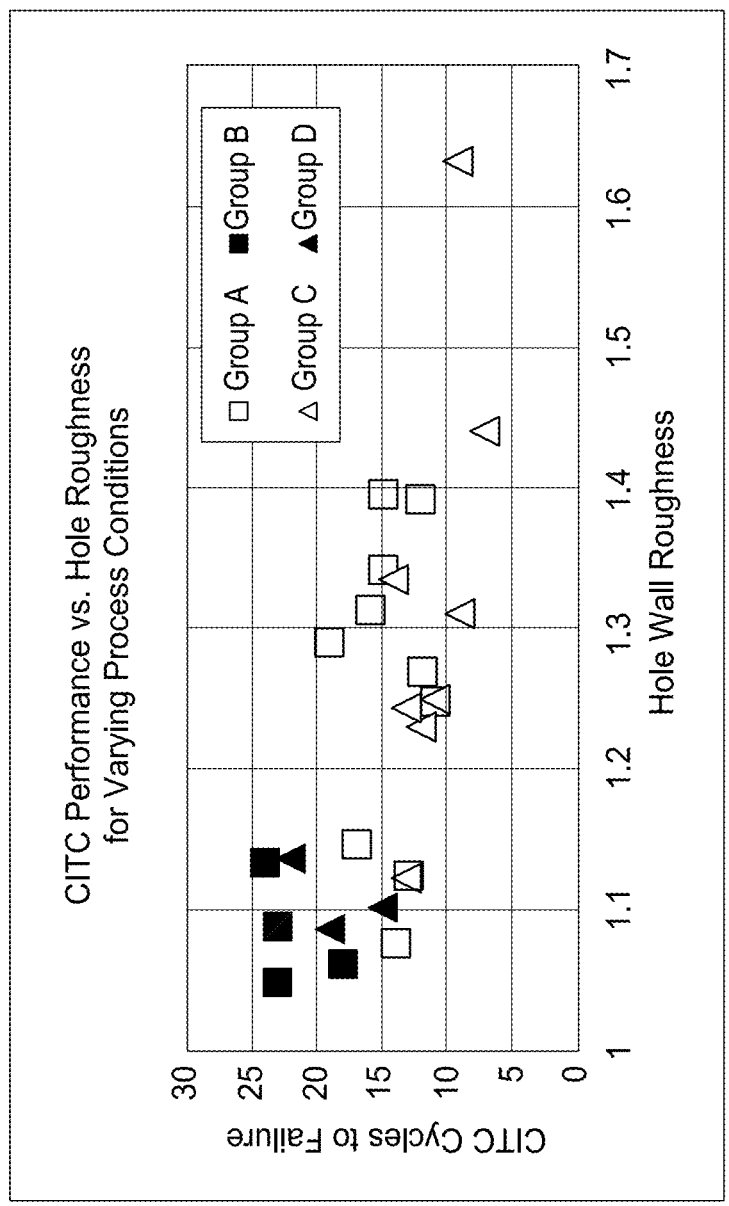
FIG. 5 illustrates PTH surface roughness versus CITC cycles to failure with four varying treatments applied for preparing PTHs.

FIG. 5 illustrates PTH surface roughness versus CITC cycles to failure with four varying treatments applied for preparing PTHs. As shown in FIG. 5, the number of cycles to fail in CITC testing are plotted as a function of the hole wall roughness measured with the method described. (Group A: hollow squares; Group B: solid squares; Group C: hollow triangles; Group D: solid triangles). Coupons with hole roughness values above about 1.3 had some CITC fails at less than 10 cycles, whereas no coupons with hole wall roughness less than about 1.3 failed prior to 10 cycles. Of the 4 processes evaluated, Groups B and D provided no CITC fails at less than 10 cycles.

These data illustrate that hole wall roughness can be measured using the imaging methods of the present disclosure. The data further illustrate that the hole wall roughness can be correlated to CITC performance. The data even further show that the image analysis techniques of the present disclosure can be used as part of a process optimization where multiple sets of process conditions can be differentiated for thermal cycle reliability based on the measured hole wall roughness.

While the examples contained herein is for illustrative purposes only, it is understood that variations on through hole treatments, CITC parameters, and imaging methods are within the scope of the present disclosure and are not limited to the above examples.

Overall, PTH imaging methods of the present disclosure provide early intervention of PTH defects so that qualification of a new PCB and/or processing parameters can be determined in less time than IST and CITC. For example, methods of the present disclosure provide screening of coupons before sending them through CITC. If the coupons are extremely rough, the likelihood that the coupons will pass CITC testing is low, so a PCB supplier need not perform CITC and may instead elect to alter the PCB fabrication process. PTH imaging methods of the present disclosure do not require a full coupon in order to assess PTH reliability if there is more than one PTH to be assessed. PTH imaging methods of the present disclosure further provide determination of non-uniformity of PTH wall roughness across a barrel in addition to quantitative and automated determination of PTH wall roughness of one or more portions of a barrel(s). Furthermore, PTH imaging methods of the present disclosure provide quantitative PTH wall roughness determination (before time consuming CITC or IST or before a failure has initiated) and provide prediction of overall lifetime characteristics of PTHs. Although non-visual reliability methods, such as IST and CITC, may be used as complimentary reliability methods, PTH imaging methods of the present disclosure provide automated and quantitative PTH wall roughness determination, saving time from running thermal cycles if, for example, the PTH wall roughness has reached a point of undesirable utility. Quantitative PTH wall roughness determination of the present disclosure further provides attenuation of the subjectivity of typical visual reliability methods, e.g. an engineer views a micrograph image and determines whether the PTH roughness is adequately low.

While the foregoing is directed to embodiments of the present disclosure, other and further embodiments of the present disclosure may be devised without departing from the basic scope thereof.

We claim:
1. A method comprising:
acquiring a micrograph image of a plated through hole;
converting the micrograph image to a binary image; and
defining a pixel line at a metal-dielectric material interface of the binary image, wherein the metal is copper;

tracing an analysis section around a portion of the binary image;
performing a pixel count of the analysis section to provide a number of pixels on the pixel line; and
determining a roughness of the interface by using the pixel line.

2. The method of claim 1, wherein defining the pixel line comprises shrinking the material interface to a width of about 1-pixel.

3. The method of claim 1, further comprising acquiring a cross section micrograph image of a printed circuit board having one or more plated through holes.

4. The method of claim 1, wherein the plated through hole has an interface between a copper plating and a dielectric material.

5. A method comprising:
acquiring a micrograph image of a plated through hole;
converting the micrograph image to a binary image;
defining a first pixel line at a metal-dielectric material interface of the binary image;
determining a roughness of the interface by using the first pixel line;
acquiring a second micrograph image of the plated through hole;
converting the second micrograph image to a second binary image; and
defining a second pixel line at a metal-dielectric material interface on the second binary image.

6. The method of claim 5, wherein the metal is copper.

7. The method of claim 5, wherein performing the pixel count is achieved using an algorithm.

8. The method of claim 5, further comprising dividing the number of pixels on the first pixel line or second pixel line by the length of the analysis section to obtain a wall roughness value.

9. The method of claim 1, wherein the tracing includes defining an axis along the pixel line and selecting an interval along the axis.

10. The method of claim 9, further comprising:
defining a second pixel line by shrinking a second material interface to a width of about 1-pixel;
tracing a second analysis section around a portion of the binary image; and
performing a second pixel count of the second analysis section to provide a number of pixels on the second pixel line.

11. The method of claim 10, further comprising obtaining an average wall roughness value using the number of pixels on the first pixel line and the number of pixels on the second pixel line.

12. The method of claim 1, further comprising performing a current induced thermal cycling process.

13. The method of claim 1, further comprising performing an interconnect stress test.

14. A method comprising:
acquiring a micrograph image of a plated through hole;
converting the micrograph image to a binary image; and
obtaining a wall roughness value by dividing a number of pixels on a pixel line by the length of a corresponding portion of the binary image.

15. The method of claim 14, further comprising performing a pixel count of the portion to determine a number of pixels on the pixel line.

16. The method of claim 15, wherein performing the pixel count includes using an algorithm.

17. The method of claim 14, wherein the wall roughness value is between about 1 and about 2.

18. The method of claim 14, further comprising defining the pixel line by using an algorithm.

19. The method of claim 18, wherein defining the pixel line further comprises shrinking the material interface to a width of about 1-pixel.

20. A method, comprising:
forming a through hole by drilling a hole into a dielectric material;
etching the through hole;
comparing a length of an interface line compared to a length of a portion to determine a roughness; and
plating the through hole.

* * * * *